United States Patent [19]

Flagg

[11] Patent Number: 5,682,667

[45] Date of Patent: Nov. 4, 1997

[54] METHOD FOR PREVENTING DAMAGE TO AN OVERSLAM BUMPER POCKET

[75] Inventor: Donald L. Flagg, Barnegat, N.J.

[73] Assignee: The Budd Company, Troy, Mich.

[21] Appl. No.: 630,545

[22] Filed: Apr. 10, 1996

[51] Int. Cl.⁶ ............................................. B23P 19/04
[52] U.S. Cl. ..................... 29/460; 29/897.2; 180/69.2; 180/69.22; 180/69.23
[58] Field of Search ........................... 29/897.2, 460; 118/500; 296/207; 180/69.2, 69.21, 69.22, 69.23

[56] References Cited

U.S. PATENT DOCUMENTS

| | | |
|---|---|---|
| 1,884,506 | 10/1932 | Atwood . |
| 1,884,838 | 10/1932 | Perry . |
| 3,022,848 | 2/1962 | Heiser ................................. 180/69.2 |
| 4,893,834 | 1/1990 | Honda et al. . |
| 5,124,191 | 6/1992 | Seksaria ............................. 180/69.2 |
| 5,404,974 | 4/1995 | Thum et al. . |
| 5,482,348 | 1/1996 | Mass et al. ....................... 180/69.21 |

FOREIGN PATENT DOCUMENTS 1281869  10/1968  Germany ............................... 296/207

Primary Examiner—P. W. Echols
Attorney, Agent, or Firm—Harness, Dickey & Pierce, P.L.C.

[57] ABSTRACT

In accordance with the teachings of the present invention, a vehicle hood including fiber reinforced plastic (FRP) panels is provided. The vehicle hood includes a fiber reinforced plastic hood outer panel bonded to a fiber reinforced plastic hood inner panel including a pair of depressions extending toward the hood outer panel. Each depression includes a projection extending away from the hood outer panel which is aligned with a hood bumper. The bonded hood outer panel and hood inner panel define a hood assembly which includes mechanisms for attachment to a vehicle, the mechanisms including a pair of hinge assemblies, a latch assembly, and a latch reinforcement member. Metal reinforcement members may be secured to the hood inner panel for structural reinforcement of the hood assembly.

5 Claims, 2 Drawing Sheets

METHOD FOR PREVENTING DAMAGE TO AN OVERSLAM BUMPER POCKET

BACKGROUND OF THE INVENTION

1. Technical Field

This invention relates to vehicles and, more particularly, to plastic hoods for land vehicles.

2. Discussion

Plastic hood assemblies for land vehicles are generally known in the art. Such hood assemblies typically include hood outer panels and hood inner panels that are fixed together to form a structurally robust hood assembly. Other components in the hood assembly typically include hinge attachment plates, hood latch striker reinforcements, a secondary hood latch assembly, metal reinforcement members, and electrical wiring and lamps, depending upon the particular hood application. Unfortunately, many of these components are necessarily placed at the forward edge of a rear hinged hood (e.g., latch reinforcements and secondary latch assembly). The positioning of these components, along with the styling trend of extending the forward edge of the hood downward toward a grill opening, tends to increase the forces experienced at hood bumper pockets formed within the plastic hood inner panel. The hood bumper pockets align with hood bumpers which are generally attached to the upper radiator support of the vehicle. Hood bumpers are used to control the alignment of the hood while in the closed position, as well as to stop the hood assembly from contacting other components (e.g., headlamp lens, grill, or front facia) during overslam thereby preventing damage to the hood or other component.

Prior to the painting process of final assembly, a paint cap is placed over the hood bumpers to protect the rubber portion from being paint coated. In order to minimize the contact surface between the paint cap and the hood bumper a conical point is formed on the top of the paint cap. The reduced area created by the conical point limits the damage which may be caused to the painted surface should the hood be lowered onto the paint cap prior to the paint being completely dried. While the conical point of the paint cap does reduce the contact area, it also increases the concentration of forces at the contact point. During the assembly process the hood may be dropped or forced closed while the paint caps are still installed, and due to the forces exerted and the concentration of those forces through the conical point, may damage the hood inner panel.

Several solutions to this problem have been proposed in the past; however, each proposed solution has disadvantages associated with it. One proposed solution is the removal of the conical point from the paint cap thereby diminishing the effect of the point load. A disadvantage to this solution is the fact that a larger contact area is created between the paint cap and the bumper pocket of the hood inner panel thereby removing the advantage of having the conical point. Further, testing indicated that the reduction in stress at the point of contact is not significantly reduced because of the radiused form of the top of the paint cap still providing a relatively small contact surface.

A second solution which has been proposed is to locally increase the material thickness of the bumper pocket to increase the structural integrity thereby resisting damage which may otherwise occur. One disadvantage of this proposed solution is the increased cost. Further, an increase in material thickness would increase the weight of the hood assembly thereby partially negating the advantage of utilizing a plastic hood.

It is therefore desirable to provide a plastic hood for a land vehicle that utilizes structural formations which exhibit high rigidity and strength characteristics in the bumper pocket area. More particularly, it is desirable to provide a plastic hood including a plastic hood outer panel and a plastic hood inner panel that are bonded to one another to form a hood assembly, the hood inner panel having a pair of hood bumper pockets which include a structurally robust projection which can withstand the force concentrations of a conical point included on a paint cap.

SUMMARY OF THE INVENTION

In accordance with the teachings of the present invention, a plastic vehicle hood and method for preventing damage to the same during painting thereof is disclosed. While the present invention will be described in connection with the use of fiber reinforced plastic (FRP) materials, it will be understood that other plastic or lightweight non-metallic materials having sufficient strength characteristics may be used.

In accordance with the teachings of one embodiment of the present invention, a vehicle hood includes a fiber reinforced plastic hood outer panel to which a fiber reinforced hood inner panel is bonded. The inner panel includes a pair of depressions extending toward the outer panel, each depression having a projection extending away from the outer panel and aligned with a hood bumper. Attachment mechanisms are connected to the hood assembly, formed by the bonded inner panel and outer panel, for fastening the hood assembly to the vehicle.

In accordance with a preferred embodiment of the present invention, a hood assembly includes a fiber reinforced plastic hood inner panel having a bumper pocket aligned with a hood bumper. The bumper pocket includes a depression extending toward a hood outer panel, with a projection disposed within the depression and coaxial with a hood bumper. The projection extending away from the hood outer panel.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENTS

The following description of the preferred embodiments is merely exemplary in nature and is in no way intended to limit the invention or its application or uses.

Figure 1:
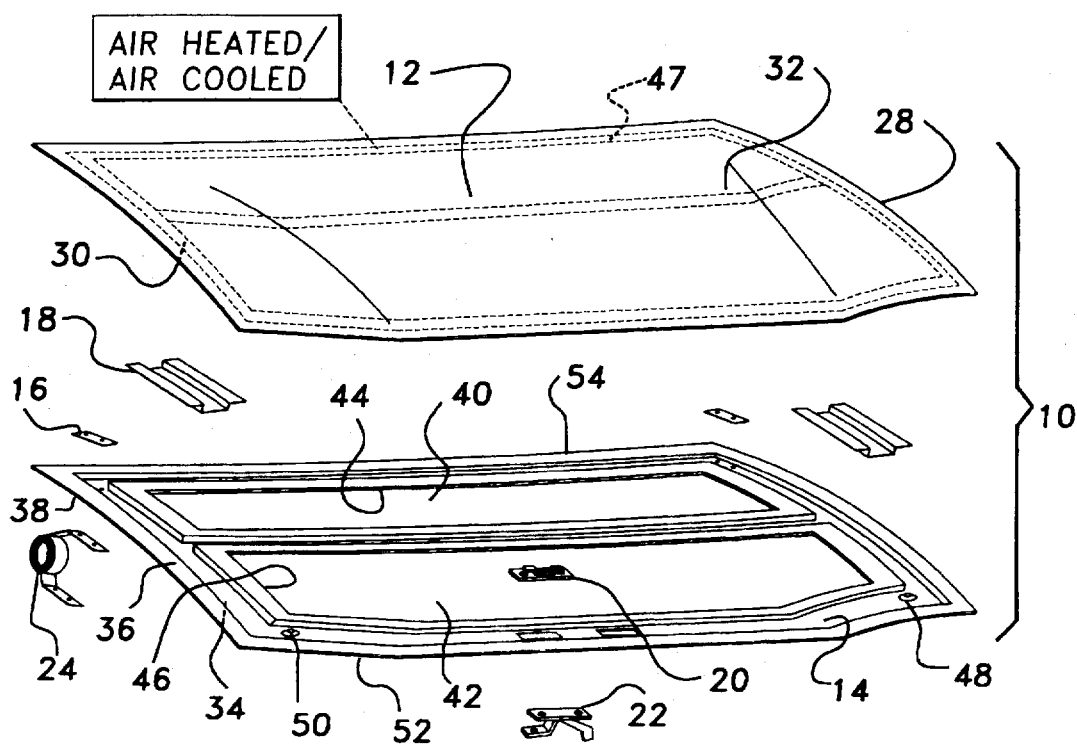
FIG. 1 is an exploded perspective view of a vehicle hood made in accordance with the teachings of the present invention.

Referring to FIG. 1, a vehicle hood 10 is shown including: a fiber reinforced plastic hood outer panel 12, a fiber reinforced plastic hood inner panel 14, hinge attachment plates 16, metal reinforcements 18, hood latch reinforcement 20, secondary latch assembly 22, and hinge assemblies 24.

The hood outer panel 12 and the hood inner panel 14 are formed from fiber reinforced plastic materials in order to reduce the weight of vehicle hood 10 and provide greater styling flexibility than is commonly available using stamped metal hoods. Hood outer panel 12 and hood inner panel 14 can both be manufactured in accordance with a vacuum compression molding technique disclosed, for example, in commonly assigned U.S. Pat. No. 5,130,071 to Iseler et al. and U.S. Pat. No. 5,370,521 to McDougall, hereby incorporated by reference, wherein sheet molding compound (SMC) is molded under vacuum using compression molding processes. Alternately, outer panel 12 and inner panel 14 can be produced as disclosed in commonly assigned U.S. Pat. Nos. 4,849,147 and 5,000,990 to Freeman, hereby incorporated by reference, wherein resin transfer molding techniques are disclosed. Generally, the disclosed resin transfer molding techniques include applying preforms to a hollow, thin-walled support formed to the configuration of the desired structure. The support is pressurized once the mold is closed. Resin is then injected into the mold to impregnate the fibrous pieces of the preforms. The mold is opened and the part removed once the resin has sufficiently cured. As shown, hood outer panel 12 is a generally continuous surface formed to coordinate with the structure and contours of a vehicle 26 (shown in FIG. 2). Outer panel 12 further includes a perimeter 28, an inner surface 30, and an outer surface 32. Outer surface 32 is a visible surface of vehicle 26 and provides a generally smooth surface which is acceptable for painting.

Hood inner panel 14 includes an outer surface 34 which is visible when the hood 10 is in an open position, an inner surface 36 generally conforming to inner surface 30 of outer panel 12 along a perimeter 38 of inner panel 14. Inner panel 14 may include a plurality of apertures, 40 and 42, to reduce the mount of material in inner panel 14 thereby reducing the weight of vehicle hood 10 and the overall weight of vehicle 26 in which hood 10 is incorporated. The perimeters 44 and 46 of apertures 40 and 42 respectively, generally conform to inner surface 30 of outer panel 12. Preferably, outer panel 12 is adhesively bonded to inner panel 14 through the use of a hot and cool air bonding apparatus and method disclosed in commonly assigned U.S. patent application Serial No. 08/379,873, filed Jan. 27, 1995, now U.S. Pat. No. 5,554,252, issued Sep.10, 1996, titled "HOT AND COOL AIR BONDING APPARATUS AND METHOD", which is hereby incorporated by reference. In accordance with the use of hot and cool air bonding apparatus and method, the uncured adhesive 47 is applied to inner surface 30 of outer panel 12. Thereafter, outer panel 12 and inner panel 14 are supported in two nest members with adhesive 47 contacting inner panel 14. Heated air is then blown about portions of outer panel 12 and inner panel 14 such that adhesive 47 located therebetween is heated above its curing temperature. Thereafter, cooler temperature air is blown about the same portions of outer panel 12 and inner panel 14 in order to quickly cool the resulting hood assembly 49 which can then be removed from the nest members.

Hood inner panel 14 further includes a pair of overslam bumper pockets 48 and 50 generally positioned along the forward edge 52 of inner panel 14 when hinge assemblies 24 are attached along a rear edge 54 of inner panel 14. Similarly, if hinge assemblies 24 were attached along a forward edge 52 of inner panel 14 then overslam bumper pockets 48 and 50 would be generally located at rear edge 54 of inner panel 14. The preferred embodiment described herein will make reference to the more common rear hinged hood with the understanding that the spirit of the present invention applies to a forward hinged hood.

Figure 2:
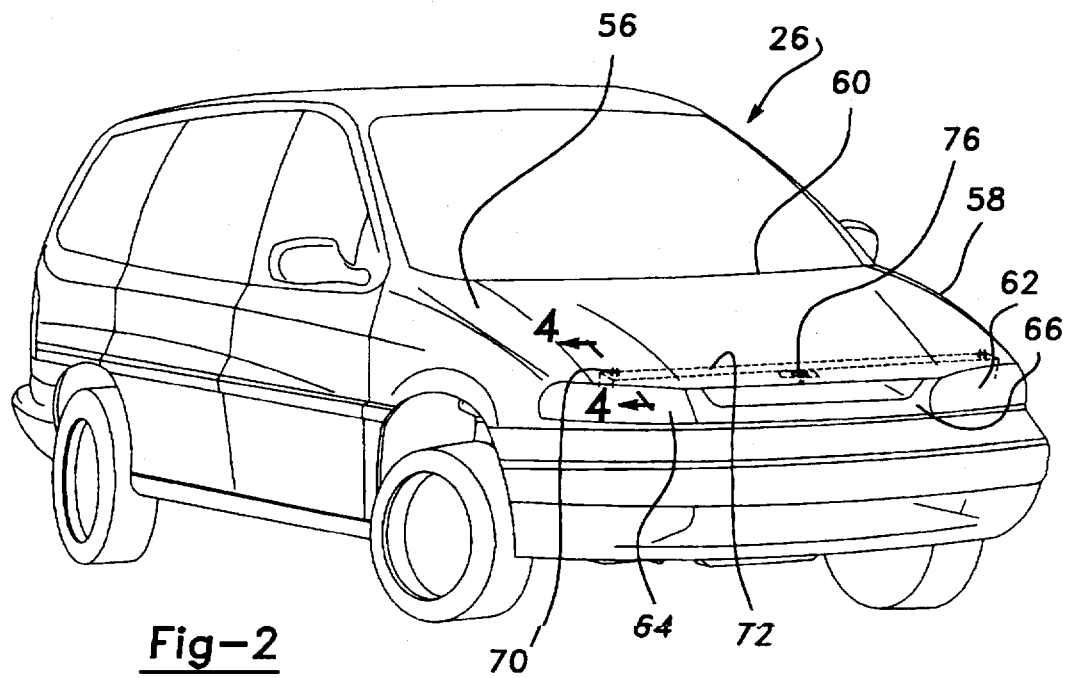
FIG. 2 is a perspective view of a vehicle including a hood made in accordance with the present invention.

With reference to FIG. 2, there is shown a vehicle 26 incorporating a vehicle hood 10 made in accordance with the teachings of the present invention. Vehicle 26 is shown to further include from fenders 56 and 58, cowl 60, head lamps 62 and 64, and grill 66. The perimeter 28 of outer panel 12 is designed to cooperate with the surrounding components 56 through 66, and provide some clearance to each of the surrounding components so as not to damage the vehicle hood 10 or the surrounding components 56 through 66.

Figure 4:
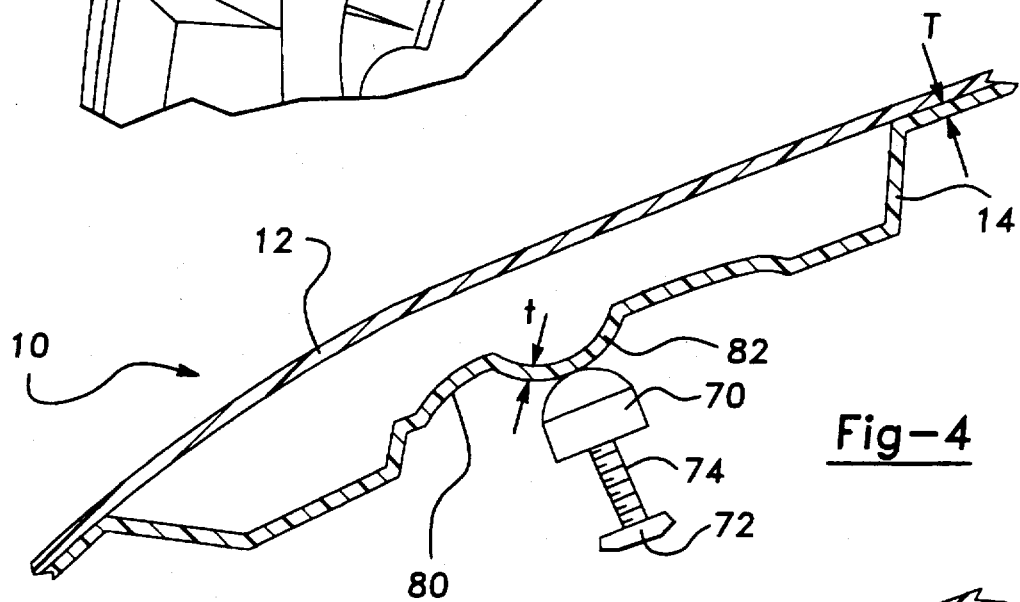
FIG. 4 is a cross-section taken along line 4—4 of FIG. 2.

Referring to FIG. 4, in order to maintain the above-referenced clearance, hood bumpers 70 are provided which align with overslam bumper pockets 48 and 50. Hood bumper 70 is generally attached to an upper radiator support 72 by a threaded shaft 74 which may be rotated to raise or lower hood bumper 70 such that correct alignment between hood 10 and the surrounding components 56 through 66 is achieved. Hood bumper 70 is generally comprised of an elastomeric material, such as rubber, so that it deflects when hood 10 is closed. In order to properly secure hood 10, a given amount of overslam must be provided. This overslam is required in order to ensure that latch 76 fully engages hood latch reinforcement 20 (Shown in FIG. 2) connected to hood inner panel 14.

Figure 3:
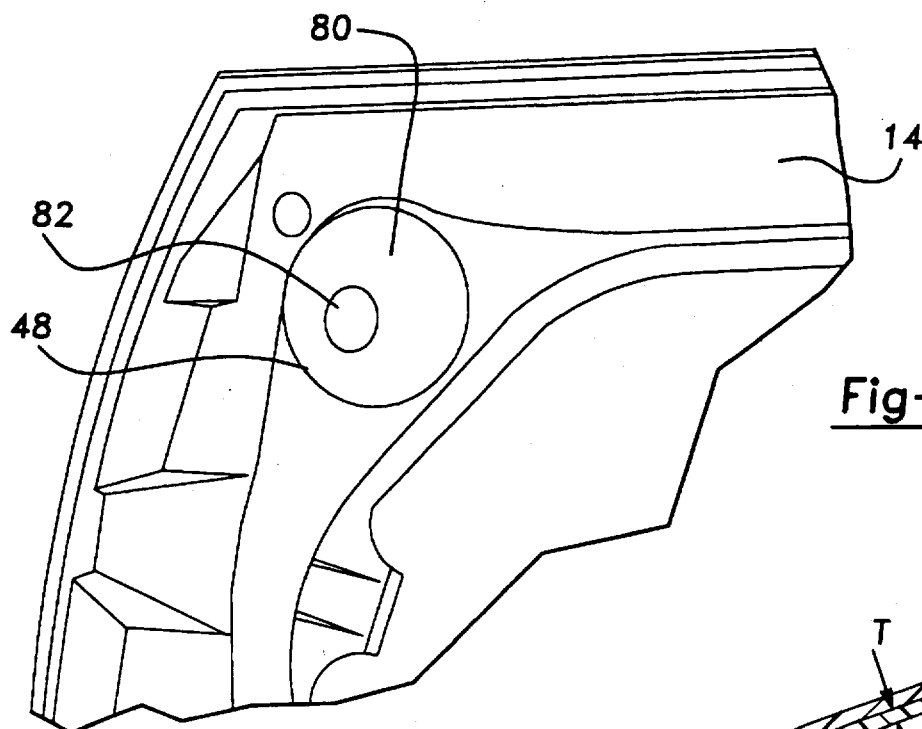
FIG. 3 is a partial bottom view of a hood assembly made in accordance with the present invention.

FIG. 3 shows a partial bottom view of vehicle hood 10 made in accordance with the teaching of the present invention. As shown, overslam bumper pocket 48 includes a depression 80 which extends toward hood outer panel 12. Located within depression 80 and extending away from hood outer panel 12 is a projection 82 which is generally coaxially located with hood bumper 70 when vehicle hood 10 is in a closed position. Projection 82 of depression 80 contacts hood bumper 70 when vehicle hood 10 is in a closed position.

Again referring to FIG. 4, projection 82 in the preferred embodiment is a generally convex shape. Projection 82 is convex such that forces exerted on projection 82 by hood bumper 70 are generally distributed in a uniform fashion and are transmitted to the surrounding structure of depression 80 and further to the surrounding structure of inner panel 14. Note that the material thickness (t) of projection 82 is substantially equal to a nominal material thickness (T) of the rest of hood inner panel 14.

Figure 5:
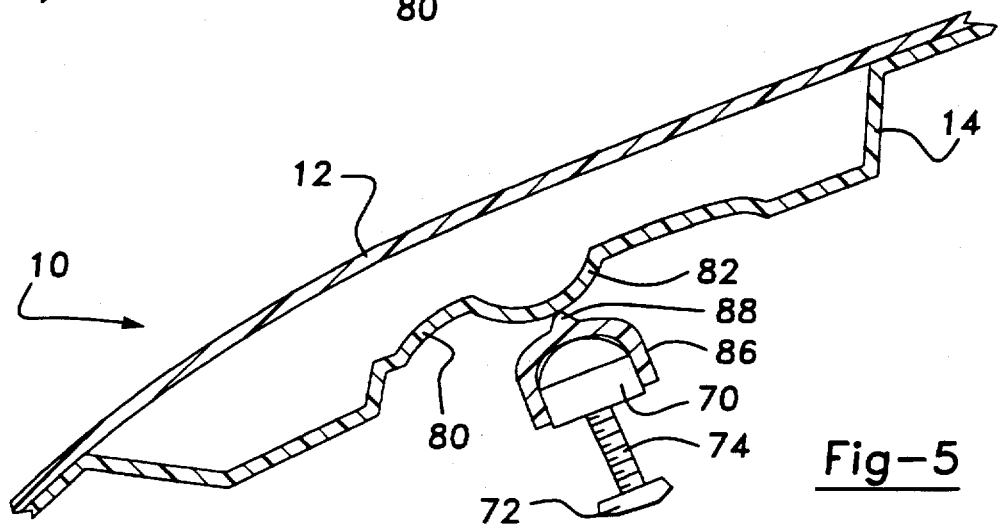
FIG. 5 is a cross-sectional view taken along line 4—4 in FIG. 2 showing the paint cap used during final assembly of a vehicle incorporating a hood assembly made in accordance with the teachings of the present invention.

With reference now to FIG. 5, hood bumper 70 is shown covered by a paint cap 86. Paint cap 86 is positioned over hood bumper 70 during final assembly of vehicle 26 prior to vehicle 26 being painted. Paint cap 86 is intended to prevent bumper 70 from being coated with paint, and by incorporating a conical point 88 atop of paint cap 86 reduce the surface contact between hood inner panel 14 and paint cap 86. However, an adverse effect of reducing the surface contact between inner panel 14 and paint cap 86, is an increase in the amount of force applied per square inch. Generally the force applied is the effective static weight of the hood when pivoted about hinge assembly 24. However, if hood 10 is dropped or forced closed while paint cap 86 is installed the dynamic forces are greater than the static forces generally experienced. The increased forces, when combined with the force concentration over a smaller surface area due to conical point 88, are substantially greater than the forces normally experienced by overslam bumper pockets 48 and 50 when in conventional use. The present invention overcomes the problem of damage being caused to hood inner panel 14 by providing projection 82 which transfers the increased forces to a larger area of depression 80 of bumper pockets 48 and 50 than if projection 82 where not incorporated.

The foregoing discussion discloses and describes a preferred embodiment of the present invention. One skilled in the art will readily recognize from such discussion, and from the accompanying drawings and claims, that various changes, modifications, and variations can be made therein without departure from the true spirit and fair scope of the invention as defined in the following claims.

What is claimed is:

1. A method for preventing damage to hood bumper pockets on a vehicle during painting thereof, said vehicle having a pair of spaced hood bumpers, said method comprising:

bonding a fiber reinforced plastic hood outer panel to a fiber reinforced plastic hood inner panel, thereby creating a hood assembly said inner panel having a pair of depressions extending toward said hood outer panel, each of said depressions having a projection extending away from said hood outer panel and aligned with one of the hood bumpers;

placing a paint cap on each of the hood bumpers, each paint cap having a conical point on top portions thereof;

attaching the hood assembly to the vehicle so that each projection is aligned with a conical point of the paint caps;

painting the hood assembly along with the remainder of the vehicle; and thereafter, lowering the hood assembly so that the conical points on the paint caps contact the projections on the hood inner panel, whereby the structure of the projections prevents damage to the inner panel in the event of overslamming of the hood assembly.

2. The method of claim 1 herein said projection has a material thickness substantially equal to a nominal material thickness of said hood inner panel.

3. The method of claim, 1 (wherein the step of bonding said inner panel to said outer panel includes the steps of:

applying an uncured adhesive to an inner surface of said outer panel for bonding to said inner panel;

positioning said inner panel and said outer panel relative to one another; and blowing heated air about portions of said outer panel and said inner panel for heating said adhesive.

4. The method of claim 3, wherein the step of bonding said inner panel to said outer panel further comprises the step of:

blowing cooler temperature air about portions of said outer panel and said inner panel for facilitating a reduction in the temperature of said adhesive.

5. The method of claim 1 further comprising:

securing one or more metal reinforcement members to said hood inner panel for providing structural reinforcement of said hood assembly.

* * * * *